350-333 SR XR 4,044,346

United States

Akahane et al.

4,044,346

Aug. 23, 1977

[54] DRIVING METHOD FOR LIQUID CRYSTAL DISPLAY

[75] Inventors: Masao Akahane; Minoru Hosokawa, both of Suwa; Kanemitsu Kubota, Shiojiri, all of Japan

[73] Assignee: Kabushiki Kaisha Suwa Seikosha, Tokyo, Japan

[21] Appl. No.: 584,310

[22] Filed: June 6, 1975

[30] Foreign Application Priority Data

June 6, 1974 Japan ................................ 49-64205

[51] Int. Cl.2 ............................................. G02F 1/13

[52] U.S. Cl. .............................. 340/336; 340/324 M; 350/160 LC

[58] Field of Search .......................... 340/324 M, 336; 350/160 LC

[56] References Cited

U.S. PATENT DOCUMENTS

| | | | |
|---|---|---|---|
| 3,835,463 | 9/1974 | Tsukamoto et al. | 340/324 M |
| 3,891,981 | 6/1975 | Torresi | 340/336 |
| 3,895,372 | 7/1975 | Kaji et al. | 340/336 |
| 3,922,667 | 11/1975 | Ueda et al. | 350/160 LC |
| 3,976,362 | 8/1976 | Kawakami | 350/160 LC |

OTHER PUBLICATIONS

P. M. Alt, IBM Tech. Dis. Bul., vol. 16, No. 5, Oct. 1973, Multiplexing for Large Matrix, Dynamic Scattering, Liquid Crystal Ceus, pp. 1456, 1457.

A. R. Kmatz, 1972 SID International Symposium Digest of Tech. Papers, June 1972, pp. 66, 67, Exp. Comparison of Mult. Tech. For Liq. Xtal Disp.

P. M. Alt, Peter Pleshko, IEEE Transactions on Electron Devices, vol. ED21, No. 2, Feb. 1974, Scanning Limitations of Liquid Crystal Displays, pp. 146–155.

*Primary Examiner*—David L. Trafton

*Attorney, Agent, or Firm*—Blum, Moscovitz, Friedman & Kaplan

[57] ABSTRACT

A multifigured or matrix-type liquid crystal display is driven by an applied voltage selected so that the effective value of the voltage applied to a display segment identified visually may have the maximum ratio to the effective value of the voltage applied to a display segment not identified visually. The multi-figured display can be driven as an X-Y matrix by coupling together the corresponding segment electrodes of each figure and sequentially actuating the common electrode of each figure. In a matrix-type liquid crystal display, the respective row electrodes of each digit would be coupled together, and the column electrodes sequentially actuated, to likewise define an X-Y matrix. In such an X-Y matrix-type liquid crystal display having N electrodes sequentially actuated, the applied voltage may be predetermined so that the voltage applied across a region of the liquid crystal material between said electrodes to be rendered visually identifiable may be ($\sqrt{N} + 1$) times as high as the voltage applied to a region of the liquid crystal material between said electrodes which is not rendered visually identifiable.

11 Claims, 5 Drawing Figures

FIG. 2
PRIOR ART
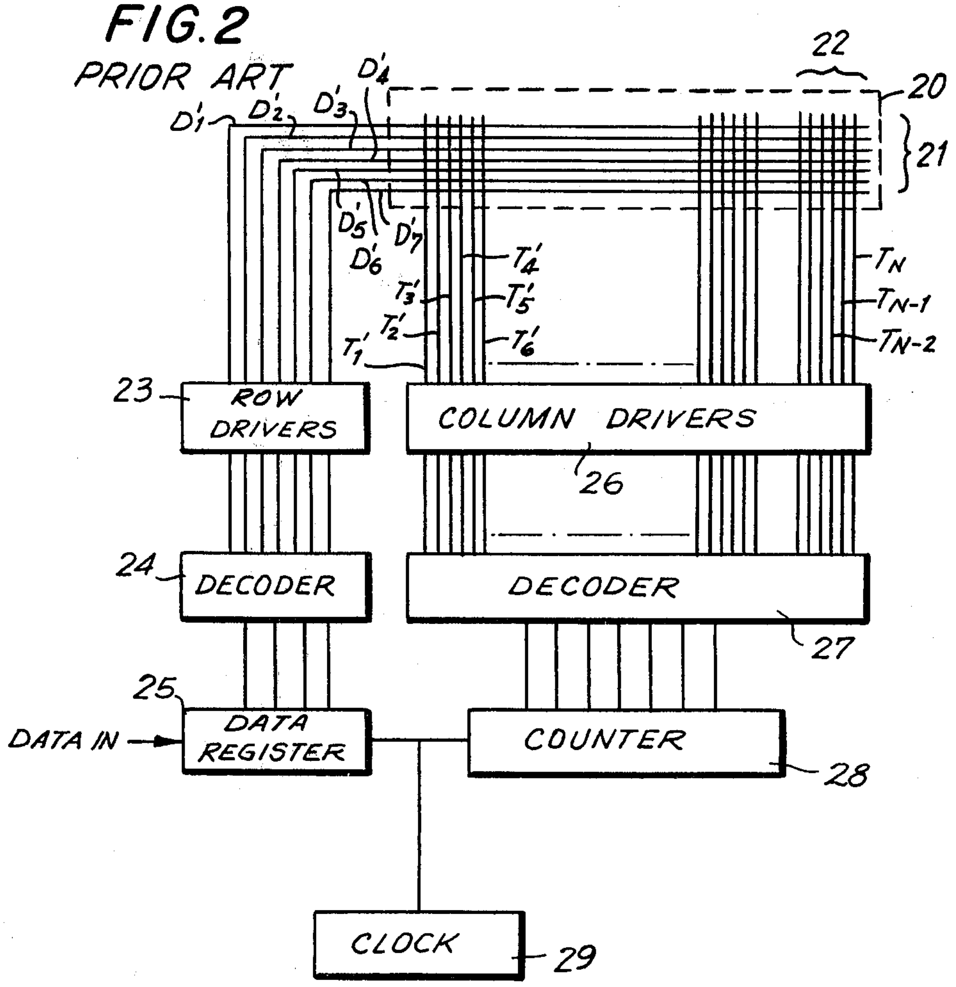
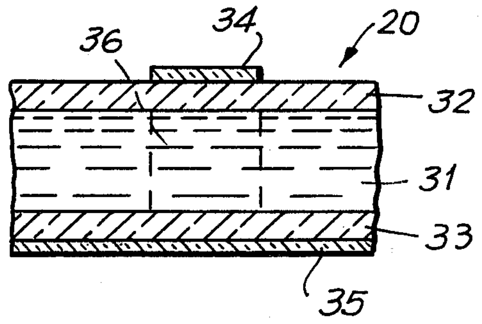
FIG. 3
PRIOR ART

DRIVING METHOD FOR LIQUID CRYSTAL DISPLAY

BACKGROUND OF THE INVENTION

This invention relates to driving methods for liquid crystal displays wherein a layer of liquid crystal material has voltages selectively applied thereacross to render said regions selectively visually identifiable. Such liquid crystal displays are particularly suitable as numeric or alpha-numeric displays for electronic table calculators, electronic timepieces, measuring instruments and the like due to the fact that such displays can be operated at relatively low power, can be formed in an extremely thin configuration, and otherwise offer packaging, cost and manufacturing advantages.

The methods of driving liquid crystal displays may be classified into two classes, static drives and dynamic drives. In the static drive method, each digit of the display is provided with a set of segmented electrodes necessary to define the characters to be displayed, as, by way of example, the seven segments of a seven-bar display utilizable in a numeric display. Each digit would also be provided with a common electrode. Separate driving circuitry would be provided for each digit, so that each digit of the display would be separately and simultaneously energized. In effect, each digit is controlled independently by data signals applied to the associated driving circuitry.

On the other hand, in the dynamic drive method, time division multiplexing is utilized so that each segment or digit is sequentially energized. In the case of a multifigure liquid crystal display formed from a plurality of seven-bar arrays of segmented electrodes, corresponding segments of each digit would be electrically coupled together and a single driving circuit would be applied to the commonly connected segmented electrodes. A time-division timing signal is sequentially applied to each common electrode of each digit, the data signal applied to the segmented electrodes rendering visible the appropriate segments of the digit having an energized common electrode. In effect, each of the digits is rendered momentarily visible in sequence at a relatively high frequency, the display giving the appearance of continuous operation due to retinal retention. The above-described display could be considered an X-Y matrix-type display. Still another matrix-type display is a dot-matrix display defined by the intersection of a plurality of parallel row electrodes and a corresponding plurality of parallel column electrodes, the column electrodes extending substantially at right angles to the row electrodes, the liquid crystal material being supported between the column and row electrodes. The intersection of a column and a row electrode represents a point or dot on the matrix, the selected energization of groups of such points or dots providing an alpha-numeric display of a single digit or a plurality of digits if a sufficient number of column electrodes are provided. The row electrodes of each digit may be electrically connected together and driven by a single driver with a time-division timing signal applied to the column electrodes to sequentially energize each such column electrode.

The dynamic drive method is advantageous in that both design and manufacture expense is substantially reduced through the substantial reduction in input signal lines to the display elements, as well as reduced driving circuitry. However, the dynamic drive method produces an inferior display effect as compared to that of the static drive method due to the poor contrast between regions of the liquid crystal material to be rendered visually identifiable and regions which are not to be rendered visually identifiable caused by the periodic application of the time-division signals to each segment during the duty cycle of the dynamic drive method.

By determining the applied voltage for each segment in accordance with the duty cycle, an optimum display effect may be produced in liquid crystal displays driven by the dynamic drive method.

SUMMARY OF THE INVENTION

Generally speaking, in accordance with the invention, a liquid crystal display is provided having a plurality of regions defined by electrodes, driving signals being sequentially applied to certain of said electrodes so that selected of said regions are sequentially rendered visually identifiable, the respective voltages applied to said electrodes being predetermined so that the effective value of the voltage applied across a region of said liquid crystal material rendered visually identifiable may have the maximum ratio to the effective value of the voltage applied to a region of the liquid crystal material not rendered visually identifiable.

Where the number of said regions to be rendered visually identifiable equals N, the applied voltage is selected so that the voltage applied across a region of the liquid crystal to be rendered visually identifiable is $(\sqrt{N} + 1)$ times as high as the voltage applied across a region of liquid crystal not rendered visually identifiable. A liquid crystal display device may be provided having an X-Y matrix-type liquid crystal display having N columns or a multifigure liquid crystal display having N digits may be provided, said N columns or N digits being sequentially energized.

Accordingly, an object of the invention is to provide a method of predetermining the voltage for driving a liquid crystal display so as to maintain the maximum contrast between the display segments to be rendered visually identifiable and the display segments which are not to be rendered visually identifiable during each cycle of the duty cycle of the time-division drive.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 2 is a block diagram of a prior art matrix-type liquid crystal display;

FIG. 3 is a fragmentary sectional view of a liquid crystal display of FIG. 2;

DESCRIPTION OF THE PREFERRED EMBODIMENT

Figure 1:
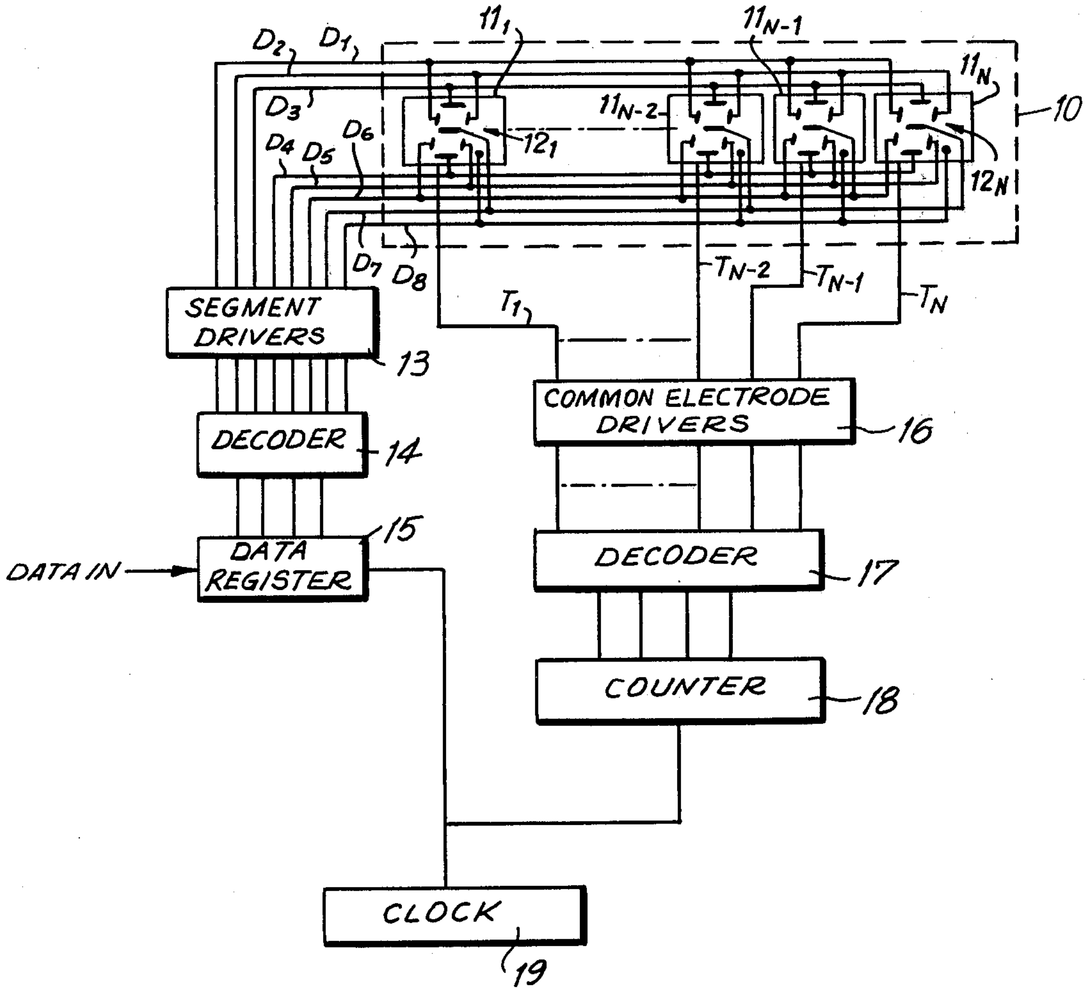
FIG. 1 PRIOR ART
FIG. 1 is a block diagram of a prior art multifigure liquid crystal display.

Referring to FIG. 1, the prior art liquid crystal display system depicted includes a liquid crystal display 10 formed with N digits of display, each digit including a common electrode $\mathbf{11}_1, \ldots \mathbf{11}_{N-1}, \mathbf{11}_N$ and a segmented electrode $\mathbf{12}_1, \ldots \mathbf{12}_{N-1}, \mathbf{12}_N$, a liquid crystal material being supported between the segmented and common electrodes so that each segment of the segmented electrode defines a region of the liquid crystal material to be rendered visually identifiable. The segmented electrodes are oriented as a seven-bar display for the purpose of providing a numeric display, and a decimal point at each location, by way of example. The corresponding segments of each segmented electrode $\mathbf{12}_1 \ldots \mathbf{12}_{N-1}, \mathbf{12}_N$ are connected together and to a common data signal input line $D_1, D_2 \ldots D_8$, one such line being provided for each segment of the segmented electrodes. The data signal input lines are connected to segment drivers 13, which receive the output of decoder 14 to apply selective driving signals to the respective data signal input lines. Decoder 14 decodes the signal in data register 15 into a form suitable for selectively energizing a seven-bar display and decimal point. The data register would include data representative of a particular number plus an indication as to whether the decimal point is to be energized or not, which number is decoded by decoder 14.

Common electrodes $\mathbf{11}_1, \ldots \mathbf{11}_{N-1}, \mathbf{11}_N$ are respectively connected to common electrode drivers 16 through timing signal input lines $T_1, \ldots T_{N-1}, T_N$. A driving signal is sequentially applied on each of said data signal input lines in response to the count of counter 18, the output of which is decoded by counter 17 to produce a sequential output signal applied to common electrode drivers 16. Counter 18 is indexed by a clock signal from clock generator 19, which also serves to sequentially index new data into data register 15. The data is indexed into data register 15 in synchronization with the count of counter 18, so that the data in data register 15 corresponds to the number to which the digit selected by counter 18 is to be actuated for display. In effect, the N digits of liquid crystal display 10 are sequentially energized once during each cycle, the cycles being repeated and the image retained by retinal retention.

FIG. 2 depicts still another prior art liquid crystal display system, based on a point or dot matrix array. In the embodiment of FIG. 2, the matrix is defined by seven rows 21 and a plurality of groups of columns 22, one group of six columns being provided for each digit to be displayed. The rows 21 are represented by seven parallel electrodes positioned on one side of the liquid crystal material. Each group of columns 22 is represented by six parallel electrodes extending at right angles to the electrodes of rows 21 and positioned on the opposite side of the liquid crystal material. Each intersection of a row and a column represents a region of the liquid crystal material capable of being rendered visually identifiable if the row and column are suitably energized. The rows are coupled to data signal input lines $D_1', D_2' \ldots, D_6'$, which are connected to row drivers 23. The row drivers are in turn driven by and coupled to decoder 24, which is in turn driven by the output of data register 25. Each of the columns is separately connected to a timing signal input line $T_1', T_2', \ldots T_{N-1}, T_{N-1}, T_N$, said timing signal input lines being connected to column drivers 26, which are in turn coupled to and driven by a decoder 27. The decoder 27 is driven by the output of counter 28, which produces a count which is used to sequentially energize each of the timing signal lines. A clock circuit 29 drives counter 28 and further indexes data register 25, so that new data is presented in said data register for each count of counter 28.

Each digit consists of a 5 × 7 matrix of points, the sixth column being provided, if required, to define a decimal point. As each column is energized, the output of row drivers 23 representative of the data in data register 25 dictates which of the points or dots on that column are to be energized to provide a portion of a particular alpha-numeric display. The duty cycle defined by clock 29 is such that the viewer of the display does not detect the repetitive flickering of each point on the display due to retinal retention.

Referring to FIG. 3, a well-known liquid crystal construction is depicted, wherein liquid crystal material 31 is sandwiched between glass plates 32 and 33. By way of example, a transparent electrode 34 representative of a single column electrode from FIG. 2 is depicted mounted on the outer surface of plate 32, while an electrode 35 representative of a single row electrode of FIG. 2 is deposited on the outer surface of FIG. 33. If a suitable signal is applied to electrodes 34 and 35 such that the voltage difference therebetween is sufficient to activate the liquid crystal material 31, the region 36 defining the overlap between electrodes 34 and 35 will be rendered visually distinguishable.

Figure 4:
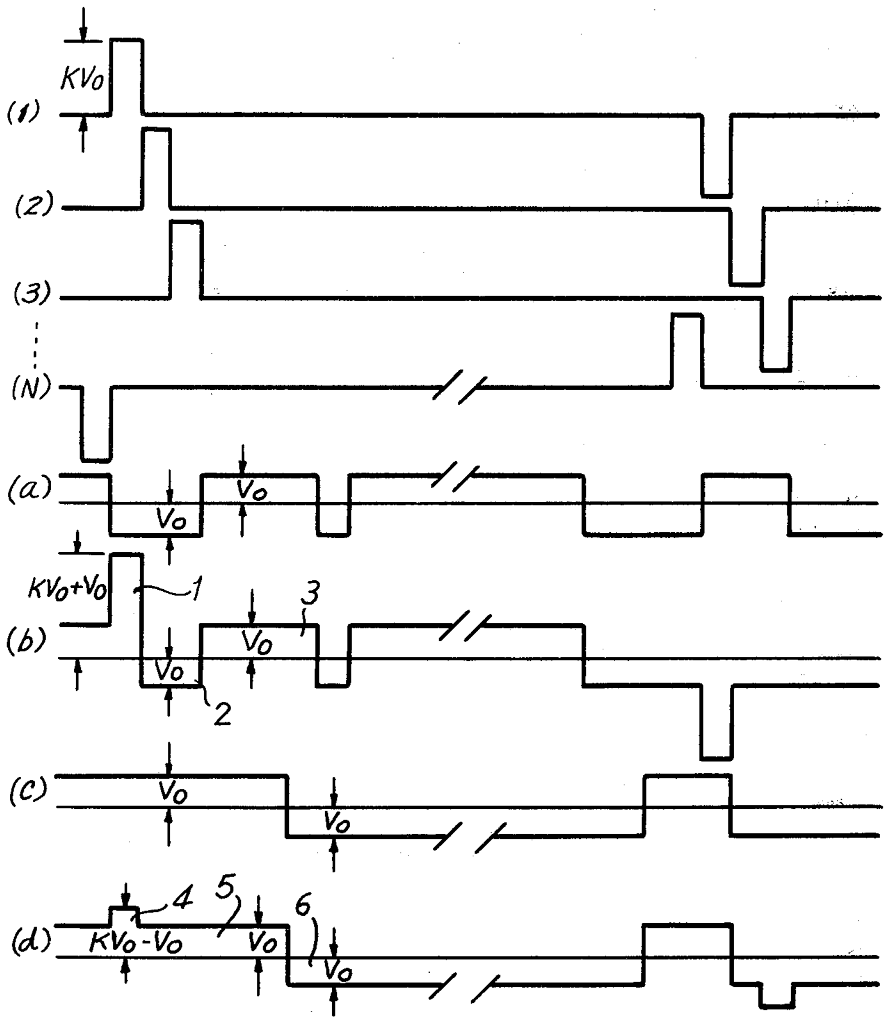
FIG. 4 is voltage wave forms in accordance with the predetermining method of the invention.

Referring now to FIG. 4, the voltage wave forms in accordance with the invention applied to a liquid crystal display of the type of FIGS. 1 and 2 are depicted. Signals (1), (2), . . . (N) represent timing signals applied respectively to timing signal input lines of FIGS. 1 or 2. A period is time-divided by N as defined by the series of pulses. Each of said pulses has a peak value of $KV_O$, K being a constant determined by the above-mentioned N (the duty cycle of time-division multiplexing) as will become more apparent below. Signals (*a*) and (*c*) are one embodiment of data signals applied to the data input signal lines of FIGS. 1 and 2, said signals having a peak value $V_O$. The duty of the time-division drive is defined by the above-mentioned N as 1/N.

As each timing signal input line (corresponding to one digit of FIG. 1 or one column of FIG. 2) receives only one timing signal, this discussion will be restricted to a description of the timing signal input line to which timing signal (1) is applied. An analogous description is equally applicable to the other timing signal input lines. Wave form (*b*) represents the voltage generated across the liquid crystal material in a region to be rendered visible, representing the effective combination of wave forms (1) and (*a*), where wave form (*a*) is applied to a segment of FIG. 1 or a row of FIG. 2, and wave form (1) is applied to a common electrode of FIG. 1 or a column of FIG. 2. The wave form (*d*) of FIG. 4 represents the voltage across a region of the liquid crystal material which is not rendered visually identifiable wherein timing signal (1) is applied to a common electrode of FIG. 1 or a column of FIG. 2, and a data signal (*c*) is applied to a segment of FIG. 1 or a row of FIG. 2.

Each of the waveforms (*b*) and (*d*) is an embodiment of the net voltage waveform applied across each region of the liquid crystal material to be rendered visually identifiable and each region not to be rendered visually identifiable, respectively.

Referring to waveform (*b*) of FIG. 1, a state wherein both the timing signal and the data signal are selected, which state corresponds to reference numeral 1 of FIG. 4, is called the selection state of an identified liquid crystal region. Where the region has the waveform (*d*) of FIG. 4 applied thereacross, timing signal is selected but the data signal is not selected, which state corresponds to reference numeral 4 in FIG. 4 and is referred to as the "half-selection state" of a non-identified region of the liquid crystal material. The voltage across such region at such state is ($KV_O - V_O$), in the embodiment of FIG. 4. Reference numerals 2 of waveform (*b*) and 6 of waveform (*d*) represent the case where the timing signals are not selected but the data signal is selected, a state referred to as the "non-selection state" of an identified region of the liquid crystal material, the voltage across such region being equal to $V_O$. Reference numeral 3 of waveform (*b*) and 5 of waveform (*d*) represent the case where there is neither a timing nor a data signal, a state identified as the non-selection state of a non-identified region of the liquid crystal material, across which is voltage $V_O$. The display effect at each region of the liquid crystal material to which signals are applied depends on the effective threshold voltage value characteristic of the applied signals. It has been found that a superior method for determining the applied voltage must provide a larger ratio of an effective value of voltage applied to a region of the liquid crystal material to be rendered visually identifiable relative to the effective value of the voltage applied to a region of the liquid crystal material not to be rendered visually identifiable. Where the duty is 1/N, $$V_1 = \sqrt{\frac{1}{N}(KV_0 + V_0)^2 + \frac{N-1}{N}(V_0)^2}$$

$$V_2 = \sqrt{\frac{1}{N}(KV_0 - V_0)^2 + \frac{N-1}{N}(V_0)^2}$$

where $V_1$ is an effective value of the voltage applied across the electrodes in registration with a region of the liquid crystal material to be rendered visually identifiable, which voltage corresponds to the waveform (*b*) depicted in FIG. 4, and $V_2$ is an effective value of voltage applied across electrodes in registration with a region of the liquid crystal material which is not to be rendered visually identifiable, which voltage corresponds to the waveform (*d*) depicted in FIG. 1.

The ratio $V_{12}(K)$ of $V_1$ to $V_2$ is given by:

$$V_{12}(K) = \frac{V_1}{V_2} = \sqrt{\frac{K^2 + 2K + N}{K^2 - 2K + N}}$$

It is desirable that $V_{12}(K)$ be as large as possible as mentioned above, and $V_{12}(K)$ takes the maximum value when $K = \sqrt{N}$. From the foregoing, it has been determined that if the peak value of the timing signal is predetermined to be $\sqrt{N}$ times as large as that of the data signal when the duty is 1/N, the most effective time-division drive can be performed. While the same effect can be achieved if the peak value of the data signal is selected to be the $\sqrt{N}$ times as large as the peak value of the timing signal, such an approach is less desirable as it would result in increased power consumption.

If the peak values of the timing signal and data signal are predetermined as mentioned above, the voltage across the electrodes in registration with an identified region of the liquid crystal material equal to $(\sqrt{N} + 1) V_O$ is applied in the selection state and a voltage equal to $V_O$ is applied in the non-selection state. The voltage across the electrodes in registration with a non-identified region of the liquid crystal material is equal to $(\sqrt{N} - 1) V_O$ in the half-selection state and equal to $V_O$ in the non-selection state.

The ratio of the effective voltage value applied across an identified region of the liquid crystal material to the effective voltage value applied to a non-identified region is given by substituting $\sqrt{N}$ for K in the formula $V_{12}(K)$, as follows:

$$A = V_{12}(\sqrt{N}) = \sqrt{\frac{N + \sqrt{N}}{N - \sqrt{N}}}$$

Figure 5:
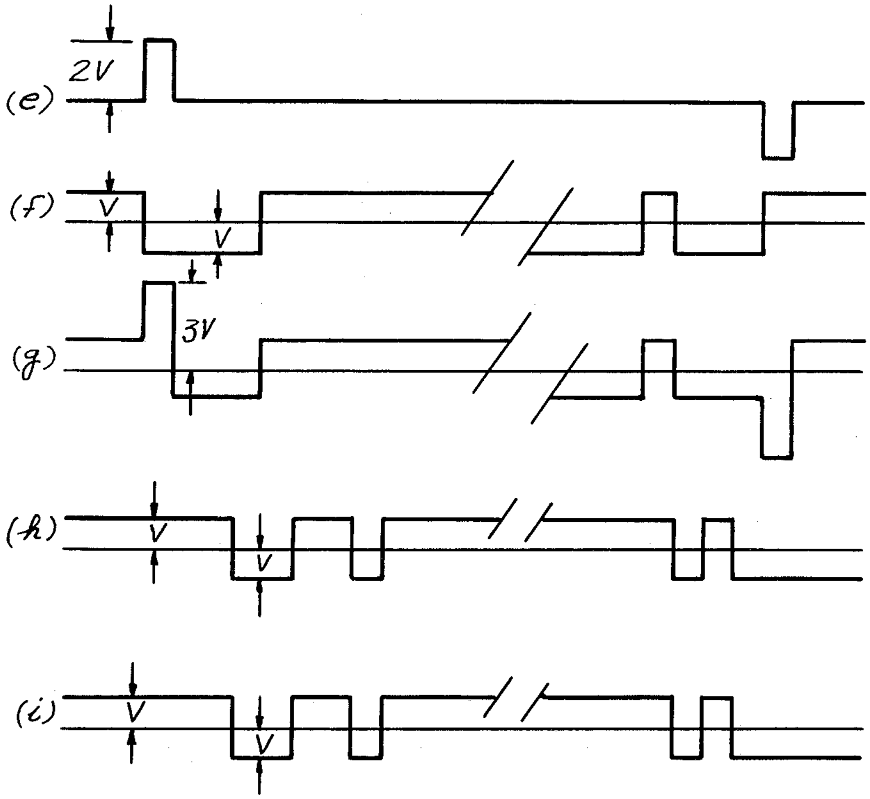
FIG. 5 PRIOR ART
FIG. 5 is voltage wave forms in accordance with a conventional V-3V voltage predetermining method.

The value A will be considered in the following discussion to demonstrate that the above-described voltage predetermining method in accordance with the invention is superior to the V-3V system voltage predetermining method which is widely used in the art, and currently considered to be the best available method. Under this method, the timing signal is selected to be twice the magnetude of the data signal. FIG. 5 illustrates the voltage waveforms resulting from the application of the prior art V-3V voltage predetermining method. Waveform (*e*) is a timing signal corresponding to timing signal (1) of FIG. 4. Waveform (*f*) is an embodiment of a data signal such as would be applied to data input signal lines of circuits of FIGS. 1 and 2 wherein the regions associated with signal (*e*) are to be rendered visually identifiable. Waveform (*g*) represents the voltage applied across the electrodes in registration with the region of the liquid crystal material to be rendered visually identifiable, the waveforms (*e*) and (*f*) being respectively applied to each of the two electrodes.

Waveform (*h*) depicts the voltage waveform of a data signal wherein the region of the liquid crystal material is not to be rendered visually identifiable. Waveform (*i*) is the voltage waveform applied across both electrodes in registration with the region of the liquid crystal material which is not to be rendered visually identifiable, the signals of waveforms (*e*) and (*a*) being each applied to one of the electrodes. In the V-3V system, as demonstrated by FIG. 5, the maximum voltage applied across a region of the liquid crystal material to be rendered visually identifiable in the selection state is 3V, while the voltage applied across such an identified region in the non-selection state is V. The voltage across a non-identified segment in the half-selection state and non-selection state is likewise V.

The ratio A' of the effective value of voltage applied across a region of the liquid crystal material to be rendered visually identifiable to the voltage applied across a region of the liquid crystal material not to be rendered visually identifiable, in the case of the V-3V time-division drive system, the duty of which is 1/N, is given by the following:

$$A' = \frac{\sqrt{\frac{1}{N}(3V)^2 + \frac{N-1}{N}(V)^2}}{\sqrt{N(V)^2}} = \sqrt{\frac{N+8}{N}}$$

Table 1 illustrates the values of K and A in accordance with the voltage predetermining method of the invention, and the values of A' in accordance with the V-3V system, as well as the value of A/A' obtained for selected values of N between 1 and 200. This Table demonstrates that the voltage predetermining method in accordance with the invention is superior to the V-3V system voltage predetermining method, as demonstrated by a comparison by the ratios of effective voltage value applied across a region of liquid crystal material to be rendered visually identifiable to the effective voltage across a region of the liquid crystal material which is not to be rendered visually identifiable over a range of values of N. Moreover, as is demonstrated by a consideration of the values of A/A', the superiority of the invention increases in response to an increase in the value of N up to a value of N equal to about 40.

| N | K | A | A' | A/A' |
|---|---|---|---|---|
| 2 | 1.4142 | 2.4142 | 2.2361 | 1.0797 |
| 3 | 1.7321 | 1.9319 | 1.9149 | 1.0089 |
| 4 | 2.0000 | 1.7321 | 1.7321 | 1.0000 |
| 5 | 2.2361 | 1.6180 | 1.6125 | 1.0035 |
| 6 | 2.4495 | 1.5427 | 1.5275 | 1.0099 |
| 7 | 2.6458 | 1.4884 | 1.4639 | 1.0169 |
| 8 | 2.8284 | 1.4470 | 1.4142 | 1.0232 |
| 9 | 3.0000 | 1.4142 | 1.3744 | 1.0290 |
| 10 | 3.1623 | 1.3874 | 1.3416 | 1.0341 |
| 20 | 4.4721 | 1.2554 | 1.1832 | 1.0610 |
| 30 | 5.4772 | 1.2028 | 1.1255 | 1.0687 |
| 40 | 3.3246 | 1.1729 | 1.0954 | 1.0707 |
| 50 | 7.0711 | 1.1530 | 1.0070 | 1.0705 |
| 100 | 10.0000 | 1.1055 | 1.0392 | 1.0638 |
| 150 | 12.2474 | 1.0853 | 1.0263 | 1.0574 |
| 200 | 14.1421 | 1.0734 | 1.0198 | 1.0526 |

The voltage predetermining method in accordance with the invention provides a ratio A having a large value, thereby providing an advantageous liquid crystal display. Such liquid crystal display is advantageous in view of the increased contrast between an identified region of the liquid crystal material and a non-identified region of the liquid crystal material. Further, a greater range for the selection of $V_O$ is available as compared with the selection of V where the V-3V system is applied.

Liquid crystal materials must be driven by an alternating current because the operative life of such material would be substantially shortened if it were driven by direct current. The voltage predetermining method in accordance with the invention provides no inconvenience where the conventional alternating current drive is applied to a liquid crystal display. The arrangement in accordance with the invention accordingly produces the optimum contrast between regions of the liquid crystal material to be identified visually and those which are not to be identified visually where the liquid crystal display is dynamically driven at a duty equal to 1/N, thereby obtaining an improved display effect in such liquid crystal displays.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A liquid crystal display having first and second sets of electrodes; liquid crystal material; means supporting said first and second sets of electrodes on opposed sides of said liquid crystal material to define, by overlapping regions of said first and second sets of electrodes, a plurality of regions of said liquid crystal material; and means for applying driving signals to said first and second electrodes for selectively rendering selected of said regions visually identifiable and not visually identifiable, said driving means being adapted to sequentially and repetitively apply driving timing signals to selected of said electrodes associated with said regions of said liquid crystal material to be rendered visually identifiable, said driving circuit means being adapted so that the ratio of the effective value of the voltage applied between the overlapping electrodes of said first and second sets of electrodes associated with a region of said liquid crystal material to be rendered visually identifiable, to the effective value of the voltage applied across the overlapping electrodes defining a region of the liquid crystal material not rendered visually identifiable, is maximum, said driving timing signal being applied sequentially and periodically to N electrodes, each of said N electrodes being one of the electrodes defining each region of the liquid crystal material to be rendered visually identifiable, said driving means being adapted so that the voltage applied across the electrodes defining each region of the liquid crystal material to be rendered visually identifiable is ($\sqrt{N}+1$) times as high as the voltage applied across a region of liquid crystal material not rendered visually identifiable.

2. A liquid crystal display as recited in claim 1, wherein said driving timing signals are sequentially and repetitively applied to the electrodes of said first set of electrodes, said driving means applying data signals to said second set of electrodes.

3. A liquid crystal display as recited in claim 2, wherein said first set of electrodes include a plurality of common electrodes each representative of a digit of the display, said second set of electrodes including a corresponding plurality of sets of segment electrodes, each set of segment electrodes overlying a common electrode, said segment electrodes being disposed so that selective actuation of one or more of said segment electrodes will produce a visual indication of an indicia, corresponding of said segment electrodes being electrically connected together for the simultaneous receipt of said driving data signal.

4. A liquid crystal display as recited in claim 1, wherein said driving timing signals are sequentially and repetitively applied to the electrodes of said first set of electrodes, said first set of electrodes including a plurality of essentially parallel linearly extending electrodes defining columns arranged in groups, groups of columns defining digits of said display, said second set of electrodes defining essentially parallel linearly extending electrodes extending substantially at right angles to said first set of electrodes and crossing all of said groups of column electrodes to define row electrodes, said driving means applying driving data signals to said row electrodes.

5. A liquid crystal display comprising first and second sets of electrodes; liquid crystal material; means supporting said first and second electrodes on opposed sides of said liquid crystal material, overlapping regions of electrodes of said first and second sets defining a plurality of regions of said liquid crystal material to be rendered visually identifiable and not to be rendered visually identifiable; and means for applying driving signals to said electrodes for producing voltages across said regions of said liquid crystal material defined by overlapping electrodes for selectively rendering said regions visually identifiable and not visually identifiable, said driving means being adapted to sequentially and repetitively apply driving timing signals to N electrodes, each of the N electrodes being one of said electrodes defining each region of the liquid crystal material to be rendered visually identifiable, said driving means being adapted so that the voltage applied between electrodes defining a region of the liquid crystal material to be rendered visually identifiable is $(\sqrt{N} + 1)$ times as high as the voltage applied across the electrodes defining a region of the liquid crystal material not rendered visually identifiable.

6. A liquid crystal display as recited in claim 5, wherein said driving timing signals are sequentially and repetitively applied to the electrodes of said first set of electrodes, said driving means applying data signals to said second set of electrodes.

7. A liquid crystal display as recited in claim 6, wherein said first set of electrodes include a plurality of common electrodes each representative of a digit of the display, said second set of electrodes including a corresponding plurality of sets of segment electrodes, each set of segment electrodes overlying a common electrode, said segment electrodes being disposed so that selective actuation of one or more of said segment electrodes will produce a visual indication of an indicia, corresponding of said segment electrodes being electrically connected together for the simultaneous receipt of said driving data signal.

8. A liquid crystal display as recited in claim 5, wherein said driving timing signals are sequentially and repetitively applied to the electrodes of said first set of electrodes, said first set of electrodes including a plurality of essentially parallel linearly extending electrodes defining columns arranged in groups, groups of columns defining digits of said display, said second set of electrodes defining essentially parallel linearly extending electrodes extending substantially at right angles to said first set of electrodes and crossing all of said groups of column electrodes to define row electrodes, said driving means applying driving data signals to said row electrodes.

9. A method for driving liquid crystal displays wherein a plurality of regions of liquid crystal material defined by at least overlapping portions of first and second sets of electrodes positioned on opposed sides of said liquid crystal material are selectively rendered visually identifiable or not visually identifiable, a driving timing signal being sequentially and repetitively applied to at least one electrode associated with each of said plurality of regions of said liquid crystal material for the time-division multiplexed dynamic driving of said liquid crystal display, said driving timing signal being sequentially and repetitively applied to N electrodes, comprising the selection of the voltage of the driving signals applied to said electrodes so that the voltage applied to a region of the liquid crystal material to be rendered visually identifiable is $(\sqrt{N} + 1)$ times as high as the voltage applied to a region of the liquid crystal material which is not to be rendered visually identifiable.

10. A method of driving liquid crystal displays as recited in claim 9, wherein said liquid crystal display is of the multi-figure type, said driving time signal selectively energizing each digit of the display.

11. A method for driving liquid crystal displays as recited in claim 9, wherein said liquid crystal display is of the X-Y matrix-type wherein said first set of electrodes are row electrodes and said second set of electrodes are column electrodes, said driving timing signal being applied to said column electrodes for the sequential and repetitive energization thereof.

* * * * *